(12) United States Patent
Tuttle et al.

(10) Patent No.: US 7,090,528 B2
(45) Date of Patent: Aug. 15, 2006

(54) SYSTEM AND METHOD FOR STABILIZING A MATING

(75) Inventors: Erick J. Tuttle, Fort Collins, CO (US); Sean W. Tucker, Loveland, CO (US); Ronald Paul Dean, Fort Collins, CO (US); Kristina Lynn Mann, Fort Collins, CO (US)

(73) Assignee: Hewlett-Packard Development Company, L.P., Fort Collins, CO (US)

( * ) Notice: Subject to any disclaimer, the term of this patent is extended or adjusted under 35 U.S.C. 154(b) by 454 days.

(21) Appl. No.: 10/141,487

(22) Filed: May 7, 2002

(65) Prior Publication Data
US 2003/0209639 A1    Nov. 13, 2003

(51) Int. Cl.
*H01R 13/648* (2006.01)
(52) U.S. Cl. .................. 439/383; 439/384; 361/685
(58) Field of Classification Search .................. 439/64, 439/61, 377, 374, 716, 327, 384, 532; 361/683, 361/685 X, 807–810, 752, 685, 730, 415
See application file for complete search history.

(56) References Cited

U.S. PATENT DOCUMENTS

| | | | | |
|---|---|---|---|---|
| 3,853,379 A | * | 12/1974 | Goodman et al. | 439/261 |
| 4,109,300 A | * | 8/1978 | Reimer | 439/377 |
| 4,550,362 A | * | 10/1985 | Reimer | 439/377 |
| 5,037,310 A | * | 8/1991 | Marinello | 439/61 |
| 5,515,515 A | * | 5/1996 | Kennedy et al. | 361/685 |
| 5,625,238 A | * | 4/1997 | Ady et al. | 439/377 |
| 5,715,146 A | * | 2/1998 | Hoppal | 361/796 |
| 5,781,414 A | * | 7/1998 | Mills et al. | 439/377 |
| 6,351,374 B1 | * | 2/2002 | Sherry | 361/685 |
| 6,411,506 B1 | * | 6/2002 | Hipp et al. | 361/686 |

OTHER PUBLICATIONS

U.S. Appl. No. 10/080,189, Tucker et al.
U.S. Appl. No. 10/080,341, Dean et al.
U.S. Appl. No. 10/141,461, Tucker et al.
"HP Visualize B2000 Unix Workstations Parts Removal/Replacement Guide," Hewlett Packard Company, (2000) pp. 1-87.

* cited by examiner

*Primary Examiner*—Briggitte R. Hammond

(57) ABSTRACT

A system and method for stabilizing a mating is provided. One embodiment comprises an apparatus for stabilizing a mating between signal connectors. The apparatus comprises a body operable to be coupled to a unit comprising a first signal connector, said body forming an aperture operable to receive at least a portion of a surface to which a second signal connector is coupled, wherein said apparatus restrains movement of the at least a portion of the surface received by the aperture when the first signal connector and the second signal connector are mated.

18 Claims, 2 Drawing Sheets

SYSTEM AND METHOD FOR STABILIZING A MATING

CROSS-REFERENCE TO RELATED APPLICATIONS

This application is related to co-pending and commonly-assigned U.S. patent application Ser. No. 10/080,189 entitled "SYSTEM AND MEANS FOR THE SECURE MOUNTING OF A DEVICE BRACKET," filed Feb. 21, 2002; co-pending and commonly-assigned U.S. patent application Ser. No. 10/080,341 entitled "DEFORMABLE MOUNTING BRACKET," filed Feb. 21, 2002; and co-pending and commonly-assigned U.S. Pat. No. 6,625,014 entitled "SYSTEM AND METHOD FOR SITUATING A DISK DRIVE," filed May 7, 2002, the disclosures of which are incorporated herein by reference.

FIELD OF THE INVENTION

The present invention relates in general to matings, and in one aspect to a system and method for stabilizing a mating.

BACKGROUND OF THE INVENTION

Objects operable to receive signals from and/or transfer signals to other objects often include a signal connector. Non-limiting examples of such objects include electrical device components, such as disk drives, power supplies, etc. A signal connector is operable to be mated with a matching connector of another object whereby the two objects become communicatively coupled (and in most instances, physically coupled as well). The signals that may be exchanged between two objects by way of such connectors may comprise numerous energy forms, non-limiting examples of which include power signals, electrical signals, optical signals, radio-frequency (RF) signals, etc.

Typically, at least one of the two objects at least communicatively coupled by way of such signal connectors is exposed to shock and/or vibration. Such vibration may potentially have an adverse effect on the mating. For example, such vibration may lead to rotation and/or translation of the mated connectors. The connectors, particularly if they are physically coupled together, may be worn down as a result.

As a non-limiting example of the above phenomena, disk drives typically include a signal connector whereby the disk drive may exchange data with other objects, as well as receive power signals from other objects. Moreover, disk drives are typically incorporated into disk drive units. Such disk drive units are normally adapted for disposition within a housing cabinet (e.g., a chassis). As part of such disposition, a disk drive unit may be integrally associated with the housing cabinet or may be removable therefrom. On average, as part of being disposed within a housing cabinet, a disk drive unit is communicatively coupled to one or more of the other contents of the cabinet. Often, such communicative coupling involves mating a signal connector of the disk drive unit with a compatible signal connector of another component within the cabinet. For example, in one instance, the disk drive unit connector is mated with a signal connector coupled to a circuit board disposed within the housing cabinet.

Quite often, a housing cabinet of the type described above is exposed to shock and/or vibration (e.g., during assembly, packaging, shipping or other types of handling). Such vibration may potentially have an adverse affect on any matings within the cabinet. For example, in some instances, in response to such shock and vibration, a large mass (e.g., a grouping of substantial surface circuit components on the circuit board) situated at a location on a circuit board proximate to a signal connector that is mated with a signal connector of a disk drive unit, influences the circuit board to vibrate. This vibration is often in a direction normal to a longitudinal surface of the circuit board. Similar to the above, such vibration may lead to rotation and/or translation of the mated connectors. The connectors may be worn down as a result.

SUMMARY OF THE INVENTION

The present invention is directed to a system and method for stabilizing a mating. One embodiment comprises an apparatus for stabilizing a mating between signal connectors. The apparatus comprises a body operable to be coupled to a unit comprising a first signal connector, said body forming an aperture operable to receive at least a portion of a surface to which a second signal connector is coupled, wherein said apparatus restrains movement of the at least a portion of the surface received by the aperture when the first signal connector and the second signal connector are mated.

DETAILED DESCRIPTION OF THE INVENTION

Figure 1:
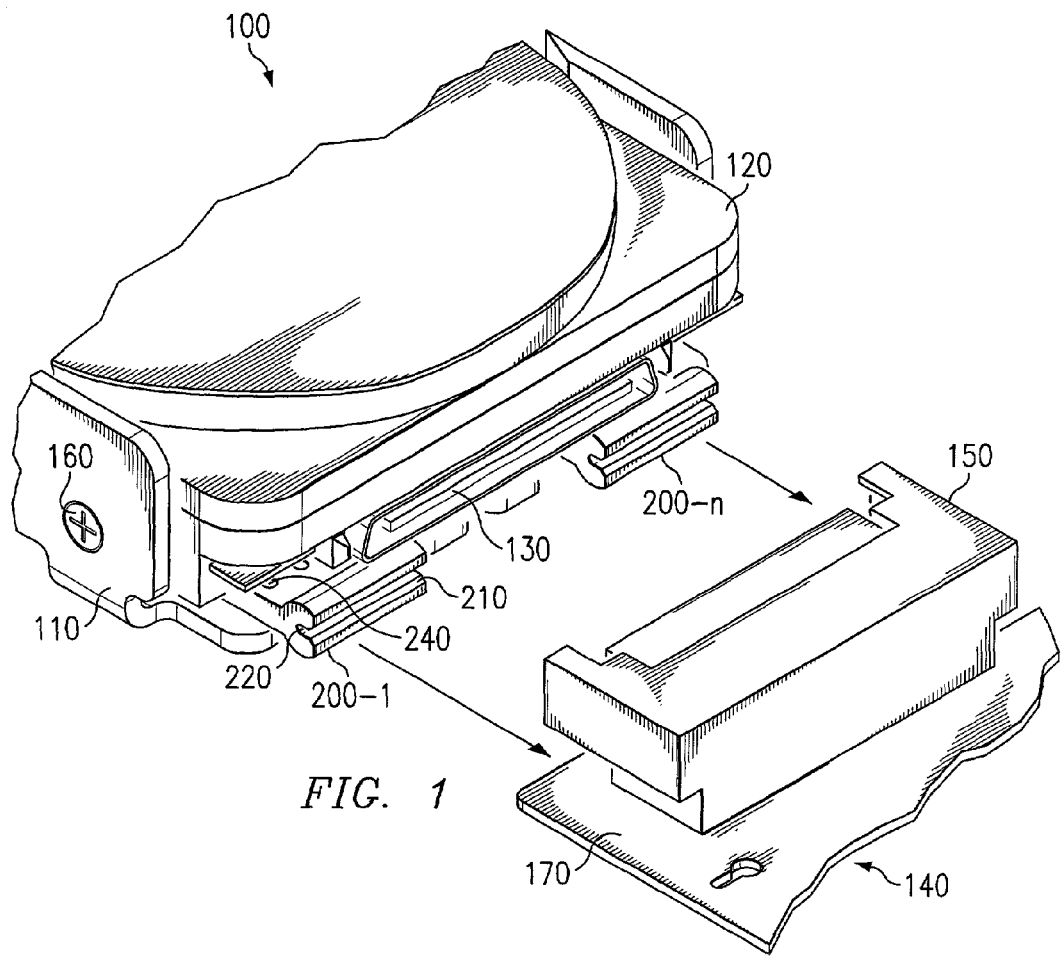
FIG. 1 depicts an exemplary unit and an exemplary surface just as a connector of the unit is being mated with a connector coupled to the surface according to an embodiment of the present invention.

FIG. 1 shows a portion of an exemplary unit 100 and a portion of an exemplary surface 140 just as signal connector 130 of unit 100 is being mated with signal connector 150 coupled to surface 140, according to an embodiment of the invention. In the illustrated embodiment, unit 100 comprises a disk drive unit. This disk drive unit may comprise a disk drive 120 integrated with mounting bracket 110 via fastening means 160. At least one stabilizing member 200 is coupled to mounting bracket 110 (e.g., stabilizing members 200-1 and 200-n). In one embodiment, signal connector 130 is part of disk drive 120. Such mating between signal connectors 130 and 150 may occur within a housing cabinet (e.g., chassis 300 of FIG. 3).

Surface 140 may be any surface. In the illustrated embodiment, surface 140 is a printed circuit board having one or more circuit elements (not shown) integrated therewith. In one embodiment, surface 140 is a mother board.

Signal connectors 130 and 150 may be any signal connector, now known or later developed (e.g., a board-mount connector). In the illustrated embodiment, signal connectors 130 and 150 allow for unit 100 to be communicatively coupled (and in some embodiments, physically coupled) to surface 140 and vice versa. Signal connector 150 may be coupled to surface 140 via any suitable means, now known or later developed. Signal connector 130 itself may be coupled to a circuit board of disk drive 120 (not shown). It will be appreciated that signal connectors 130 and 150 may be coupled to surfaces other than those illustrated (e.g., other structures within a chassis and/or unrelated to a chassis).

In one embodiment, signal connector 130 includes at least one lead, at least one socket, and/or the like, that is compatible with at least one lead, socket, etc. of signal connector 150, so as to enable mating between the two. The matable parts of signal connector 130 and signal connector 150 may together make up an array of electrical contacts, such as engageable male-female connections. Multiple leads, sockets, etc., of signal connectors 130, 150 may be parallel connected in order to provide sufficient current handling capability to provide any necessary power supply connection to unit 100.

Disk drive 120 may be one of numerous data storage media now known or later developed. Non-limiting examples of such include a hard disk drive, an optical drive, a tape drive, a floppy drive, and/or the like.

As mentioned, disk drive 120 may be integrated with mounting bracket 110 via fastening means 160. Mounting bracket 110 may be of any shape, size, configuration, and material suitable for mounting a disk drive to a housing cabinet (e.g., a chassis). Mounting bracket 110 may be adapted for fixed or removable mounting of disk drive 120 to a housing cabinet. Thus, disk drive unit 100 may be a fixed or removable disk drive unit. Embodiments of removable disk drive units are provided in U.S. patent application Ser. No. 10/080,189, U.S. patent application Ser. No. 10/080,341, and U.S. Pat. No. [6,625,014], the disclosures of which have been previously incorporated herein by reference.

Fastening means 160 may be any suitable means for coupling disk drive unit 120 to mounting bracket 110. In one embodiment, fastening means 160 includes one or more screws that engage threads of disk drive 120.

It will be appreciated that stabilizing member 200 is not limited to use with disk drive units. Stabilizing member 200 may be used with other units, to include other fixed or removable units. A non-limiting example of such a unit is a hot swap power supply.

As mentioned, in the illustrated embodiment, at least one stabilizing member is coupled to unit 100. It will be appreciated, however, that stabilizing member 200 may be attached to various other structures (e.g., other structures within a chassis). In one embodiment, a stabilizing member comprises a structure that helps stabilize a mating between a first signal connector (e.g., signal connector 130) and another signal connector, such as a signal connector coupled to a surface (e.g., connector 150). In some embodiments, a stabilizing member enables such stability by restraining movement of at least a portion of surface 140.

Figure 2:
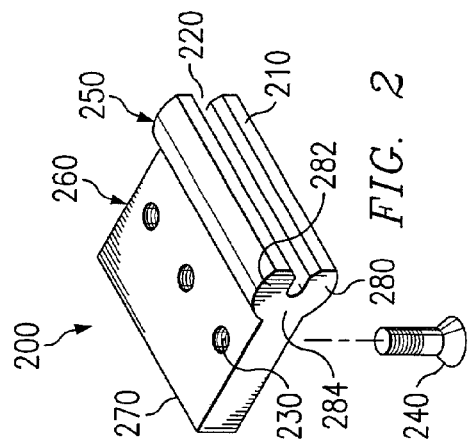
FIG. 2 depicts an exemplary stabilizing member in accordance with an embodiment of the present invention.

An exemplary embodiment of a stabilizing member is depicted in FIG. 2. In the illustrated embodiment, stabilizing member 200 comprises a body 260 forming an aperture (e.g., aperture 220) for receiving a portion of a surface (e.g., surface 140) when signal connector 130 and signal connector 150 are being mated. In one embodiment, when a portion of the surface is disposed within aperture 220 of member 200, at least one of the surfaces defining the aperture restrain movement of at least that portion of the surface 140 received by the aperture (discussed in greater detail below).

In one embodiment, an end 250 of body 260 forms the above-mentioned aperture. In the illustrated embodiment, end 250 is substantially U-shaped. Thus, end 250 may comprise first and second portions (e.g., portions 280 and 282) extending at angles from a third portion (e.g., portion 284).

In addition or in the alternative of the above, body 260 (and therefore stabilizing member 200) may comprise at least one beveled surface (e.g., surface 210). Furthermore, end 250 may comprise one or more of these beveled surfaces. In one embodiment, such beveled surfaces align surface 140 and the aperture of member 200 (e.g., when signal connectors 130 and 150 are being mated). Moreover, in one embodiment, member 200 aligns signal connectors 130 and 150, e.g., for mating (described in greater detail below).

Furthermore, body 260 may further comprise a second end 270. In the illustrated embodiment, proximate to second end 270, member 200 forms at least one coupling hole (e.g., coupling hole 230) for coupling stabilizing member 200 to a structure (e.g., mounting bracket 110). It will be appreciated by one of ordinary skill in the art that the coupling holes may be located elsewhere on member 200.

In one embodiment, member 200 may be coupled to a structure, such as unit 100, by passing at least portion of a coupling means (e.g., coupling means 240) through at least one of the coupling holes formed by member 200. Such coupling means may include any of numerous coupling means, now known or later developed (e.g., screws, bolts, snaps, and/or the like). In some embodiments, member 200 is welded to or formed as part of unit 100 (e.g., as part of bracket 110). Moreover, in one embodiment, member 200 is coupled to a structure (e.g., mounting bracket 110) via passing screws through holes formed by the structure and engaging threads of the surfaces of member 200 forming the earlier-mentioned coupling holes.

Stabilizing member 200 may be formed from a single material or a combination of materials. In one embodiment, member 200 is formed from extruded aluminum. In another embodiment, member 200 is formed from plastic.

In the mating of signal connectors 130 and 150 depicted in FIG. 1, as connector 130 approaches connector 150 and/or vice versa, at least a portion of a surface 140 is received within the apertures formed by stabilizing members 200-1 and 200-n. In one embodiment, such receipt occurs prior to or simultaneous with the mating of the connectors. Once a portion of surface 140 is received within these apertures, one or more of the surfaces of stabilizing members 200-1 and 200-n forming the earlier mentioned apertures restrain movement of at least the portion of surface 140 received within the apertures. In one embodiment, stabilizing members 200-1 and 200-n restrain movement of surface 140 in at least a direction normal to a longitudinal portion of surface 140 (e.g., surface 170). Additionally or in the alternative, stabilizing members 200-1 and 200-n may restrain movement of surface 140 in a direction parallel to a longitudinal portion of surface 140. For example, in one embodiment, friction provided by one or more surfaces of stabilizing members 200-1 and 200-n restrain movement of surface 140 in such a parallel direction.

In one embodiment, apertures of stabilizing members 200-1 and 200-n are arranged such that when surface 140 is received within the apertures, signal connectors 130 and 150 are in proper alignment (at least proper alignment with respect to a plane normal to a longitudinal portion of surface 140) for a suitable mating. Moreover, in some embodiments, as connector 130 approaches connector 150 (and/or vice versa), if surface 140 is not in alignment with the apertures whereby the surface may be received therein (and therefore, in some embodiments, not in proper alignment with unit 100 for mating of the connectors), one or more beveled surfaces of stabilizing members 200-1 and 200-n (e.g., surface 210) influence surface 140 and/or disk drive unit 100 towards a position of alignment between surface 140 and the apertures. In one embodiment, as a result of surface 140 and/or disk drive unit 100 being influenced towards alignment between the surface and the apertures, signal connector 130 and/or signal connector 150 are influenced towards proper alignment for mating. Such help in aligning the connectors is particularly useful when blind-mate connections are attempted.

It will be appreciated by one of ordinary skill in the art that the items depicted in FIGS. 1 and 2 are by way of example only. Disk drive unit 100, signal connectors 130 and 150, surface 140, stabilizing member 200, etc., may contain fewer, more, and/or different components than those depicted in FIGS. 1 and 2. In addition, such components may be arranged in a manner other than that depicted in FIGS. 1 and 2. As a non-limiting example, stabilizing member 200 may have a different shape and size. For example, end 270 may have a more rounded shape then that depicted in FIG. 2. Similarly, end 250 may be shaped in a substantially V-shaped form, a substantially C-shaped form, etc. Moreover, stabilizing members 200-1 and 200-n may be of different sizes and shapes.

Figure 3:
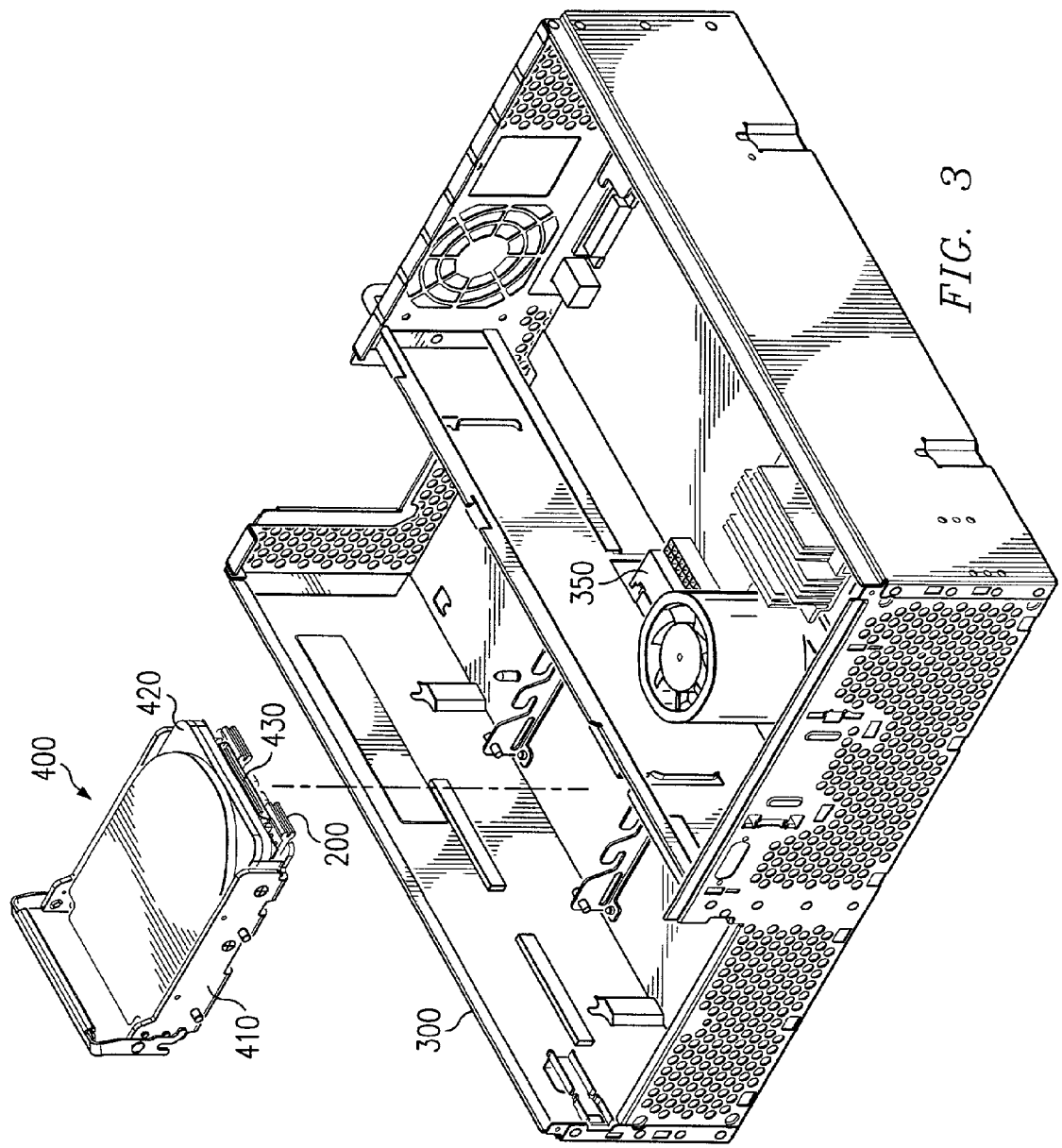
FIG. 3 depicts an isometric view of an exemplary unit as it is being situated within an exemplary chassis which can accommodate one or more such units in accordance with an embodiment of the present invention.

As mentioned earlier, the mating between a connector of a unit and a connector coupled to a surface may occur within a housing cabinet. FIG. 3 depicts an exemplary embodiment of a chassis 300 comprising a signal connector 350 coupled to a circuit board (not shown) as a signal connector 430 of an exemplary disk drive unit 400 is being situated within chassis 300 for mating of signal connectors 350 and 430. Similar to the above, in the illustrated embodiment, disk drive unit 400 comprises a disk drive 420 coupled to a mounting bracket 410. At least one stabilizing member (e.g., stabilizing member 200) is coupled to mounting bracket 410.

Figure 4:
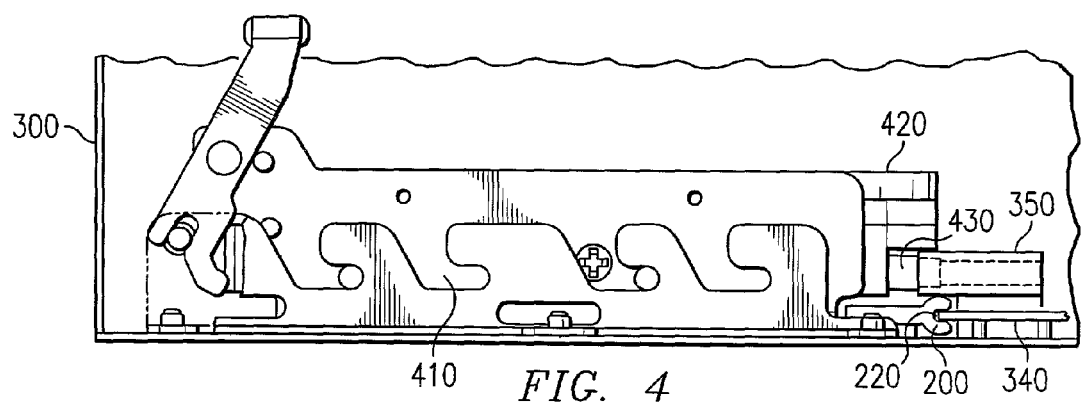
FIG. 4 depicts an exemplary mating of an exemplary first connector and an exemplary second connector.

FIG. 4 depicts a cross-section of chassis 300 after connector 430 has been mated with signal connector 350. In the illustrated embodiment, portions of circuit board 340 are disposed within apertures (e.g., aperture 220) formed by the stabilizing members coupled to mounting bracket 410.

Figure 5:
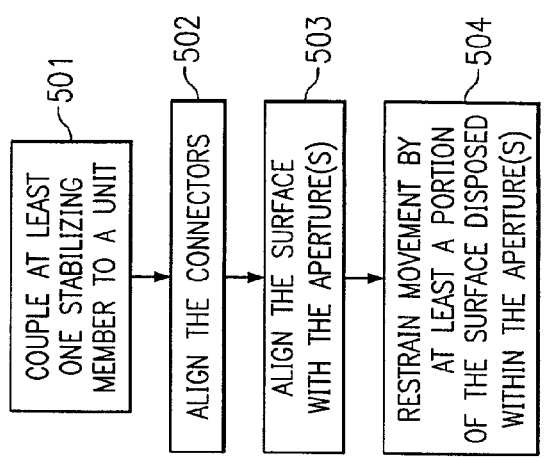
FIG. 5 depicts a flow diagram for exemplary steps of a method for stabilizing a mating according to an embodiment of the present invention.

An exemplary flow diagram depicting exemplary steps of a method for stabilizing a mating is depicted in FIG. 5. In the illustrated embodiment, at least one stabilizing member 200 is coupled to unit 100 (box 501). In one embodiment, unit 100 comprises signal connector 130. The stabilizing member(s) coupled to unit 100 may form an aperture(s), such as aperture 220, operable to receive at least a portion of surface 140 to which signal connector 150 is coupled.

In some embodiments, as part of the above-discussed mating of signal connectors 130 and 150, the earlier-discussed stabilizing members may align signal connectors 130 and 150 for mating (box 502). As part of such, in one embodiment, at least one beveled surface 210 of the stabilizing member(s) aligns surface 140 and the aperture(s) formed thereby (box 503).

Moreover, in one embodiment, the aperture(s) formed by the stabilizing member(s) may receive at least a portion of surface 140 therein (box 504). In some embodiments, the stabilizing member(s) then restrains movement of the at least a portion of surface 140 disposed within the aperture(s). Such restraining may be restraining of movement of surface 140 in a direction normal to a longitudinal portion of surface 140.

It will be appreciated by one of ordinary skill in the art that the steps, as well as the order of the steps, shown in FIG. 5 and discussed above, are by way of example only. More, fewer, and/or different steps than those shown in FIG. 5 may be included the above-discussed method. Moreover, the steps may be performed in an order other than that depicted in FIG. 5.

As can be seen, various embodiment of the present invention alleviate the problems encountered with existing matings between signal connectors. For example, in one embodiment, at least one stabilizing member restrains movement of a surface coupled to a connector when such a connector is mated with a connector of a unit. In some embodiments, by restraining movement, these stabilizing members prevent any of the rotating, translation, etc., hindering existing matings when, e.g., the surface is exposed to shock and/or vibration. In addition, in some embodiments, the first connector is aided in the alignment for mating with the second connector.

What is claimed is:

1. An apparatus for stabilizing a mating between signal connectors, said apparatus comprising:
  a body operable to be coupled to a disk drive unit comprising a first signal connector, said body forming an aperture operable to receive at least a portion of a surface to which a second signal connector is coupled;
  wherein said apparatus restrains movement of said at least a portion of said surface received by said aperture when said first signal connector and said second signal connector are mated.

2. The apparatus of claim 1 wherein said apparatus restrains movement of at least a portion of said surface received by said aperture in at least a direction normal to a longitudinal portion of said surface.

3. The apparatus of claim 1 wherein said body comprises an end forming said aperture, said end being shaped in a form selected from the group consisting of a substantially U-shaped form, a substantially V-shaped form, and a substantially C-shaped form.

4. The apparatus of claim 1 wherein said end is shaped in a substantially U-shaped form.

5. The apparatus of claim 1 wherein said body comprises at least one beveled surface operable to influence alignment between said surface and said aperture during mating of said first signal connector and said second signal connector.

6. The apparatus of claim 1 wherein said surface comprises a circuit board.

7. The apparatus of claim 1 wherein said disk drive unit is a removable disk drive unit.

8. A method for stabilizing a mating between a first signal connector and second signal connector, said method comprising:
  coupling at least one stabilizing member to a disk drive unit, said disk drive unit comprising said first signal connector, wherein said at least one stabilizing member forms an aperture operable to receive at least a portion of a surface to which said second signal connector is coupled;
  receiving said at least a portion of said surface in said aperture during mating of the first signal connector and the second signal connector; and
  restraining by said at least one stabilizing member of movement of said at least a portion of said surface disposed within said aperture.

9. The method of claim 8 wherein said disk drive unit is a removable disk drive unit.

10. The method of claim 8 wherein said restraining comprises restraining movement of said at least a portion of said surface in a direction normal to a longitudinal portion of said surface.

11. The method of claim 8 wherein said at least one stabilizing member comprises an end forming said aperture, said end being shaped in a form selected from the group consisting of a substantially U-shaped form, a substantially V-shaped form, and a substantially C-shaped form.

12. The method of claim 8 wherein said at least one stabilizing member comprises a body comprising a substantially U-shaped end forming said aperture.

13. The method of claim 8 further comprising aligning by at least one beveled surface of said at least one stabilizing member of said surface and said aperture during said mating of the first signal connector and the second signal connector.

14. The method of claim 8 further comprising aligning by said at least one stabilizing member of the first signal connector and the second signal connector for mating.

15. The method of claim 8 wherein said surface comprises a circuit board.

16. The method of claim 12 wherein said circuit board is a motherboard.

17. An apparatus for use in stabilizing a mating between a connector of a disk drive unit and a connector coupled to a circuit board, said apparatus comprising:

means for receiving at least a portion of said circuit board during mating of the disk drive unit connector and the connector coupled to the circuit board; and means for restraining movement of said at least a portion of said circuit board when disposed within said receiving means.

18. The apparatus of claim 17 further comprising means for receiving a coupling means for coupling said apparatus to said disk drive unit.

* * * * *